United States Patent [19]

Wagner

[11] Patent Number: 4,676,001
[45] Date of Patent: Jun. 30, 1987

[54] PORTABLE COMPASS SAW

[75] Inventor: Rudolf Wagner, Stuttgart, Fed. Rep. of Germany

[73] Assignee: REMS-WERK Christian Föll und Söhne GmbH & Co., Waiblingen, Fed. Rep. of Germany

[21] Appl. No.: 761,603

[22] Filed: Aug. 1, 1985

[30] Foreign Application Priority Data

Aug. 1, 1984 [DE] Fed. Rep. of Germany ....... 3428436

[51] Int. Cl.$^4$ .............................................. B27B 11/02
[52] U.S. Cl. .................................. 30/393; 30/272 A; 30/372; 74/50
[58] Field of Search ............ 30/393, 394, 392, 272 A, 30/272 R, 372; 74/416, 417, 50

[56] References Cited

U.S. PATENT DOCUMENTS

| | | | |
|---|---|---|---|
| 1,661,217 | 3/1928 | Farrell | 74/50 X |
| 2,713,271 | 7/1955 | Dodegge | 74/50 |
| 3,657,813 | 4/1972 | Knight | 30/392 X |
| 4,206,657 | 6/1980 | Palm | 74/50 |
| 4,385,443 | 5/1983 | O'Banion | 30/393 |
| 4,550,501 | 11/1985 | Moores, Jr. et al. | 30/393 |

Primary Examiner—Frank T. Yost
Attorney, Agent, or Firm—Becker & Becker, Inc.

[57] ABSTRACT

A portable compass saw which is provided with an oscillation drive for driving a saw blade. The oscillation drive includes a gear, which is mounted on a shaft in the housing; engaging in the teeth of the gear is a pinion of a drive shaft of a drive motor. At a distance from its axis of rotation, the gear is provided with a pin extending parallel thereto. The pin is in driving connection with a clutch member, which is connected to the push rod and has a guide for the bolt, with the guide extending at right angles to the longitudinal axis of the push rod. The teeth of the gear are provided on that side of the gear which faces the push rod. The pinion is located in the region between the push rod and the gear, which is seated loosely on the shaft and is held on the latter under the load of the pinion. As a result, the gear is held reliably in its installed position, even though it is seated loosely on the shaft and is not secured to prevent axial displacement by separate securing members.

7 Claims, 16 Drawing Figures

PORTABLE COMPASS SAW

BACKGROUND OF THE INVENTION

1. Field of the Invention

The present invention relates to a portable compass saw having a housing in which are accommodated a drive motor which serves for a push rod provided with a saw blade, and an oscillating drive, which includes a gear which is held by means of a shaft in a mounting in the housing; engaging in the teeth of the gear is a pinion of a drive shaft of the drive motor at a distance from, and parallel to, the axis of rotation of the gear, the latter having a pin which is in driving connection with a clutch member, which is connected to the push rod and has a guide for the pin, with the guide extending at right angles to the longitudinal axis of the push rod.

2. Description of the Prior Art

In this known compass saw, the push rod is displaceably mounted in a carriage which is pivotably mounted in the housing. The clutch member is attached to the push rod, and is displaceably guided on guide surfaces of the pivotable carriage. The oscillation drive for producing the reciprocating movement of the saw blade is located, with respect to the saw position, in the region below the saw blade. The gear is arranged in such a way that its teeth are on that side remote from the push rod. The pinion is thus disposed below the gear. So that the gear is not pushed from its shaft by the pinion, it must be secured in its installed position in the housing in a complicated manner. As a result, the assembly of the compass saw is made more expensive and more difficult.

An object of the present invention is to construct this compass saw in such a way that the oscillation drive has a simple construction and allows a simple and economical assembly of the compass saw.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The compass saw according to the present invention is characterized primarily in that the teeth of the gear are provided on that side of the latter which faces the push rod, in that the pinion is disposed in the region between the push rod and the gear, and in that the gear is seated loosely on the shaft and is held on the latter under the load at least of the pinion.

In the inventive compass saw, the pinion of the oscillation drive is located in the region between the gear and the push rod. Consequently, the gear is also pushed into its installed position by the pinion, in addition to being pushed by the saw pressure. As a result, the gear is held reliably in its installed position, even though it is seated loosely on the shaft, i.e., it is not additionally secured against axial displacement. It is thus possible to dispense with separate securing parts, which not only make the manufacture of the compass saw and its assembly more expensive, but also make the assembly of the compass saw more difficult. The oscillation drive of the inventive compass saw can be assembled and dismantled very easily. At the time of assembly, it is merely necessary to place the gear on the shaft. Additional securing measures are not necessary, because the gear is secured in position by the pinion. Dismantling of the oscillation drive is correspondingly simple, since the gear can be removed from the shaft without difficulty.

Further features of the invention will become apparent from the following.

DESCRIPTION OF PREFERRED EMBODIMENTS

Referring now to the drawings in detail, the compass saw is a hand operated, lightweight implement, and has an elongated housing 1, which has an approximately oval or elliptical contour. The housing 1 (FIG. 13) has a housing part 2 in which an electric motor is located. Adjoining one end of the housing part 2 is a handle 3 which extends in the longitudinal direction of the housing 1, and which is provided with a switch 4 for actuating the electric motor. A power connection cable 5 emerges from the handle 3 at the free end face thereof. Connected to the other end of the housing part 2 is a further housing part 6 in which a drive unit for driving a saw blade 7 is located. The housing parts 2 and 6, as well as the handle 3, are detachably connected to one another, so that the electric motor, the switching device, and the drive unit are easily accessible for the purpose of repair or maintenance.

Figure 1:
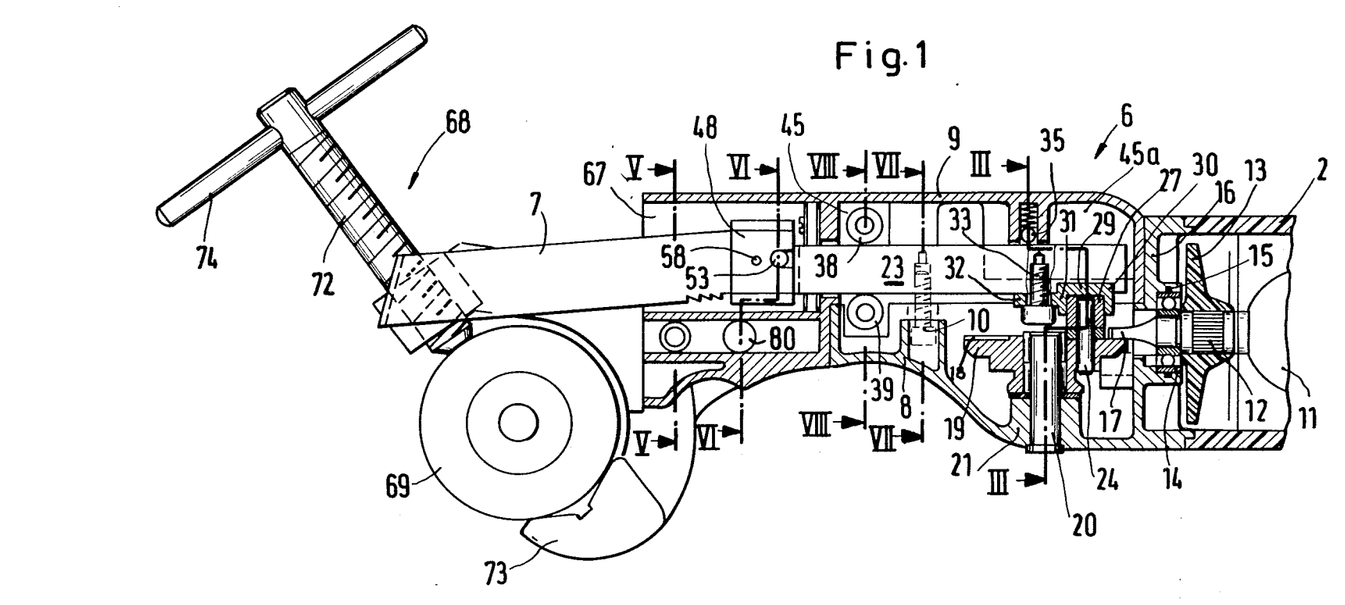
FIG. 1 is a view that shows one embodiment of a compass saw according to the invention, partly in longitudinal section and partly in elevation.
Figure 4:
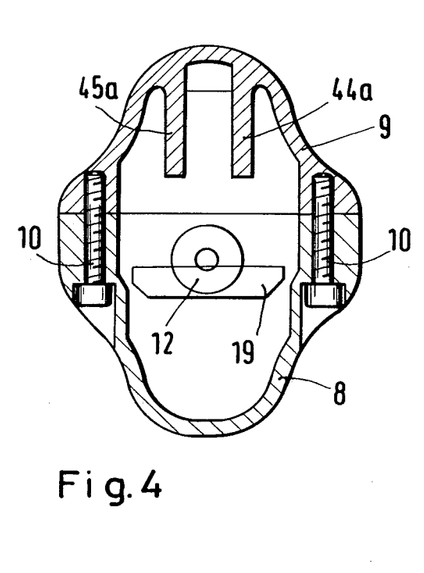
FIG. 4 is a view showing a section taken along line IV—IV of FIG. 2.
Figure 7:
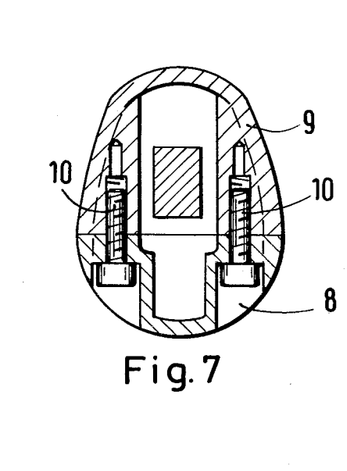
FIG. 7 is a view showing a section taken along line VII—VII of FIG. 1.

As shown in FIG. 1, the housing part 6 consists of two halves 8 and 9, which are detachably connected to one another by screws 10 (FIGS. 1, 4 and 7).

The electric motor 11, illustrated partially in FIG. 1, has a drive shaft 12 which is centrally disposed in the housing part 2, and on which a fan wheel 13 is seated inside the housing part 2. The drive shaft 12 is rotatably supported in the housing part 2 by a bearing 14 which is surrounded by a collar 15, which in turn projects inwardly from the end wall 16 of the housing part 2 and is constructed in one piece with the latter. The drive shaft 12 projects into the housing part 6, and its free end is constructed as a pinion 17 which engages in teeth 18 of a spur gear 19. The latter is seated on a shaft 20, which is mounted in a thickened housing projection 21 of the lower housing half 8 and projects in the direction of the upper housing half 9 at right angles to the axis of the drive shaft 12. By means of a needle bearing 22 (FIG. 3), the spur gear 19 is rotatably mounted on the shaft 20 and is supported axially on the thickened housing projection 21. The spur gear 19 is located close to the housing part 2 in the housing part 6, and serves for the oscillating drive of a push rod 23, to the free end of which the saw blade 7 is connected.

Figure 2:
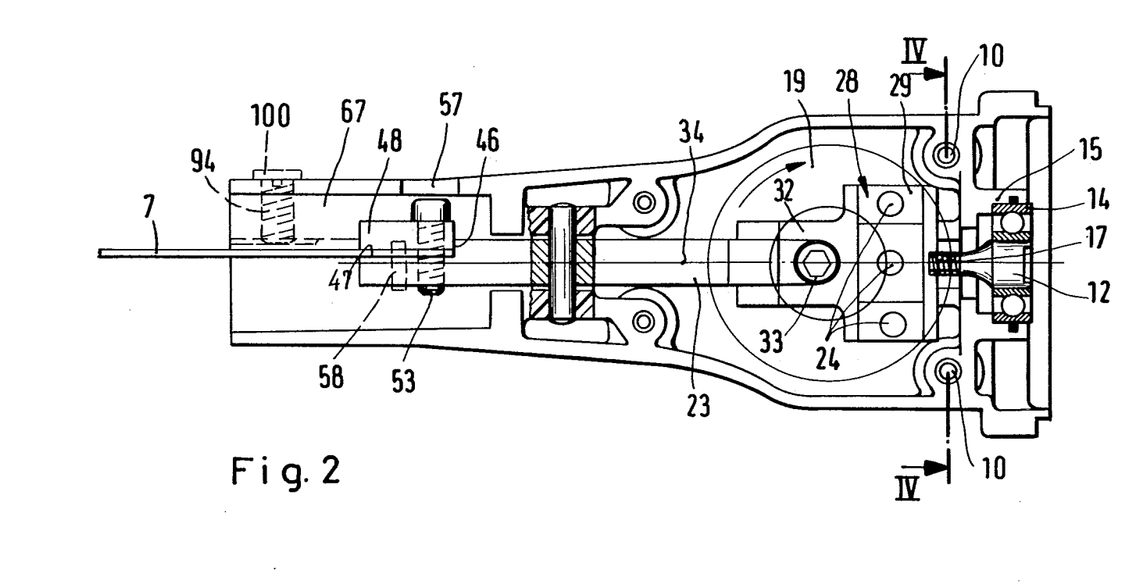
FIG. 2 is a plan view of a lower half of the compass saw of FIG. 1, with a bolt of an oscillation drive being shown in different positions.

In the area outside the region of engagement of the pinion 17, a pin or bolt 24, which is disposed parallel to the shaft 20, passes through the spur gear 19. The bolt 24 projects upwardly beyond the teeth 18, and is rigidly secured in the spur gear. Seated on the bolt 24 is a spacer sleeve 25 (FIG. 3) which is disposed on that side of the spur gear 19 which faces the push rod 23. The spacer sleeve 25 projects above the spur gear 19, and supports a sliding member 27 which is seated on the bolt 24 in such a way that it can rotate thereon. A clutch member 28 (FIGS. 2 and 3), which has a T-shape in plan view, is moved back and forth in an oscillating manner in the housing part 6 in the longitudinal direction of the latter by means of the sliding member 27. The push rod 23 is attached to the clutch member 28. The T-shaped clutch member 28 has a cross-piece 29, which has a U-shaped cross-section (FIG. 1). Its inside width corresponds to the width of the sliding member 27, which is disposed between the sides 30 and 31 of the cross-piece 29. That end of the push rod 23 remote from the saw blade 7 is detachably connected by means of a screw 33 to the foot 32 (FIG. 2) of the clutch member 28. As shown in FIG. 1, the push rod 23 extends, in the direction toward the housing part 2, beyond the cross-piece 29 of the clutch member 28. The cross-piece 29 is provided with an appropriate recess on its upper side for receiving the push rod 23. The longitudinal axis of the cross-piece 29 extends at right angles to the longitudinal axis 34 of the push rod 23 (FIG. 2). The sliding member 27 is able to move back and forth in the cross-piece 29 of the clutch member 28 during the rotation of the spur gear 19. As soon as the spur gear 19 rotates, the bolt 24 is entrained or taken along. Since the sliding member 27 is held positively in the cross-piece 29, during the rotation of the spur gear 19 the sliding member 27 is moved back and forth within the cross-piece 29, in which case the cross-piece 29, and thus the entire clutch member 28, are moved back and forth in the axial direction of the push rod 23. The cross-piece 29 is of such a length that the sliding member 27 does not come free from the cross-piece. In this way, the rotary movement of the bolt 24 is converted by the sliding member 27 into an oscillating movement of the push rod 23, and hence of the saw blade 7. The size of the stroke is determined by the distance of the bolt 24 from the shaft 20 of the spur gear 19.

Figure 3:
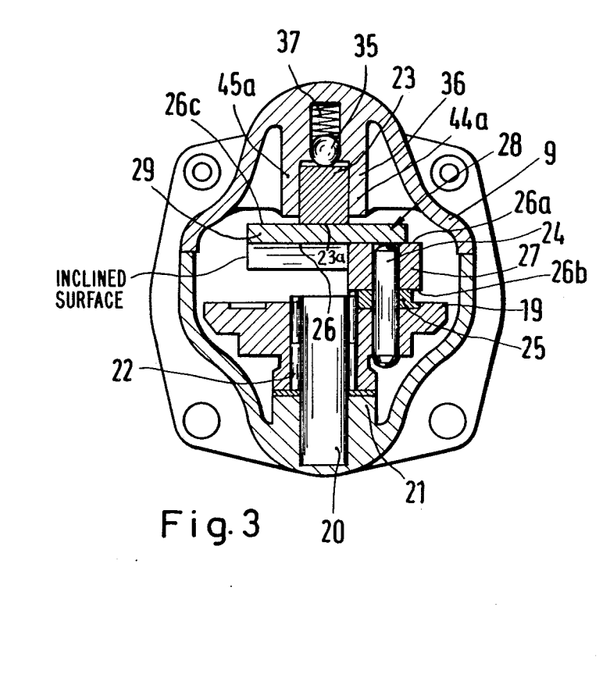
FIG. 3 is a view showing a section taken along line III—III of FIG. 1.

In order that the saw blade 7 not only carries out a reciprocating movement, but also moves up and down, namely carries out a so-called vertical stroke, the underside 26 of the cross-piece 29 is inclined at an acute angle with respect to the upper side of the spur gear 19. In the illustration of FIG. 3, the underside 26 rises from left to right. The upper side 26a of the sliding member 27 is inclined in a corresponding manner. The underside 26b of the sliding member 27 is disposed at right angles to the shaft 20 and bolt 24, and is parallel to the upper side of the spur gear 19. In the illustrated embodiment, the upper side 26c of the cross-piece 29 is parallel to its underside 26. The underside 23a of the push rod 23 is inclined in a corresponding manner, so that it can rest on the cross-piece 29 in an optimum manner. The upper side 26c and the underside 23a may, however, also be parallel to the upper side of the spur gear 19. However, the clutch member 28 is easier to produce if the upper and lower side 26c and 26 are parallel to one another.

In FIG. 2, the different positions of the bolt 24 with respect to the cross-piece 29 are illustrated during rotation of the spur gear 19. During the movement of the bolt 24 relative to the cross-piece 29, as a result of the inclined sides 26, 26a, the clutch member 28 moves up and down in the axial direction of the shaft 20. The push rod 23 and the saw blade 7 thus also carry out this movement. The downward movement of the clutch member 28 is ensured by the push rod 23, which as a result of the saw pressure exerts a force on the clutch member, with this force being directed toward the spur gear 19. As a result of the previously described construction of the drive, the saw blade carries out a reciprocating movement as well as a superimposed vertical stroke. Consequently, the saw blade 7 moves virtually on an elliptical path. This elliptical stroke is particularly advantageous for the removal of chips and for the return stroke of the saw blade during sawing, without any pressure having to be exerted on the back of the saw teeth.

At the height of the foot 32 of the clutch member 28, on the side opposite the spur gear 19, the push rod 23 is guided by a ball 35 which is under the force of a spring (FIGS. 1 and 3). The ball is mounted in a cylindrical projection 36, which is provided on the inside of the upper housing half 9 and is constructed in one piece with the latter. Also located in the projection 36 is a compression spring 37, which presses the ball 35 against the push rod 23. Thus, by means of the ball 35, there is ensured that the push rod 23 is guided without play close to its free end. The spring-loaded ball 35 also assists in the upward stroke of the clutch member 28.

Figure 8:
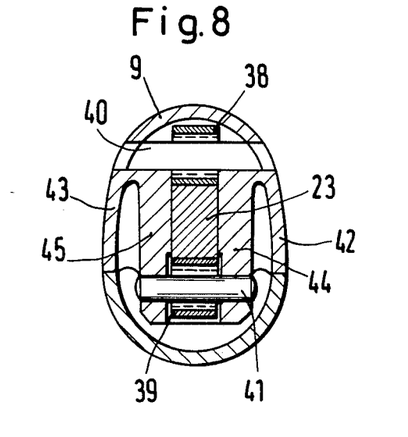
FIG. 8 is a view showing a section taken along line VIII—VIII of FIG. 1.

At a distance from the spur gear 19 and the ball support 35, the push rod 23 is guided precisely on the upper side and lower side by two needle bearings 38 and 39 at right angles to the direction of the stroke. As shown in FIG. 8, the needle bearings 38, 39 are seated on bearing pins or bolts 40, 41 which are parallel to one another. The ends of the upper bearing bolt 40 are mounted in the opposing wall sections 42 and 43 of the upper housing half 9. The lower bearing bolt 41 is mounted in intermediate walls 44 and 45, which are provided inside the housing part 6 and also guide the push rod 23 in the axial direction. In the region above the spur gear 19, the push rod 23 is likewise guided by the facing inner sides of two intermediate walls 44a, 45a (FIGS. 3 and 4), of the housing part 6, which are spaced from, and are in alignment with, the intermediate walls 44, 45. The intermediate walls 44a, 45a terminate at a slight distance from the clutch member 28, so that the vertical stroke of the latter is not impeded.

The push rod 23 has an approximately rectangular cross-section, and is arranged on its edge, so that with respect to the cutting pressure occurring at the time of sawing, the push rod has a high moment of resistance. In place of the rectangular cross-section, the push rod 23 may also have an approximately square cross-section. The two needle bearings 38, 39 support the push rod 23 with respect to the cutting pressure occurring during sawing. Since the needle bearings 38, 39 are disposed at a distance from the spur gear 19 close to the end face of the compass saw, the push rod 23 is supported on the upper needle bearing 38 during sawing in such a way that its free end is pushed in the direction toward the spur gear. The push rod 23 thus carries out a type of swinging movement about its support point on the upper needle bearing 38. Thus, during sawing, the load is largely removed from the ball 35, which serves essentially exclusively for guiding the push rod 23. Furthermore, due to the pinion 17, a force is exerted on the spur gear 19 in the operative position and in the non-operative position. If the compass saw is not operating, or if sawing with the latter is not taking place, then the ball 35 bears under spring force against the push rod 23 and prevents it from tilting about the needle bearing support. Pressure in the direction of its shaft is thus exerted constantly on the spur gear 19. There is therefore no need for the spur gear 19 to be secured axially; it merely has to be placed on the shaft 20. The assembly of the compass saw is consequently facilitated. Since the push rod 23 is guided on all sides by the needle bearings 38, 39, the intermediate walls 44, 45, 44a, 45a, and the ball 35, the push rod, and thus also the saw blade 7, may be guided precisely, so that very accurate cuts can be produced with the inventive compass saw, i.e. cuts disposed exactly at right angles to the axis of the workpiece.

The width of the needle bearings 38, 39 corresponds to the width of the push rod 23 (FIG. 8), whereas the intermediate walls 44, 45, 44a, 45a, which are constructed in one piece with the housing part 6, extend beyond part of the length of the push rod (FIG. 1). Thus, as the push rod moves back and forth, it is consequently guided at all times without play in the stroke direction and at right angles thereto. In this case, the needle bearings 38, 39 ensure that the push rod 23 can be moved with an easy motion. In place of the needle bearings 38, 39, ball bearings or other roller bearings may also be used, with which a play-free guidance and support of the push rod 23 is ensured.

Figure 16:
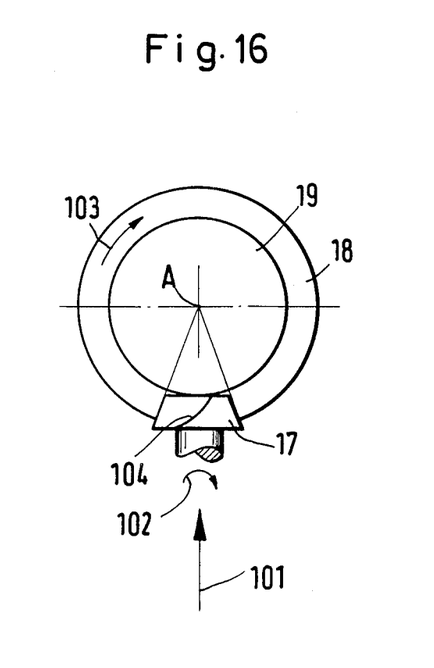
FIG. 16 is a plan view of a spur gear and a pinion of the oscillation drive of the inventive compass saw.

The teeth of the pinion 17 and of the spur gear 19 are constructed in such a way that as it rotates, the pinion experiences a pushing or shearing force component 101 (FIG. 16) in the direction toward the axis A of the spur gear. In the illustration according to FIG. 16, the pinion 17 rotates in the clockwise direction, in the direction of the arrow 102, viewed in the axial direction. The spur gear 19 is consequently rotated in the clockwise direction, in the direction of arrow 103, seen in a plan view. In this case, the teeth 104 of the pinion 17 are right-handed, and the teeth 18 of the spur gear 19 are left-handed. This produces the desired shearing force component 101, which ensures a reliable engagement of the pinion 17 in the spur gear 19, and thus ensures a trouble-free drive.

Figure 6:
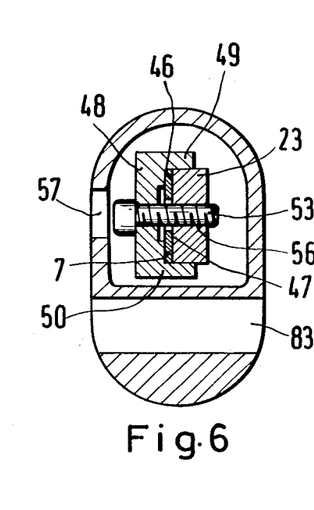
FIG. 6 is a view showing a section taken along line VI—VI of FIG. 1.
Figure 10:
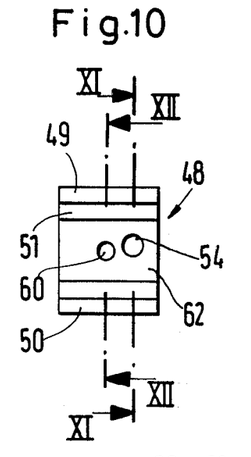
FIG. 10 is a plan view of a contact piece of the inventive compass saw.
Figure 11:
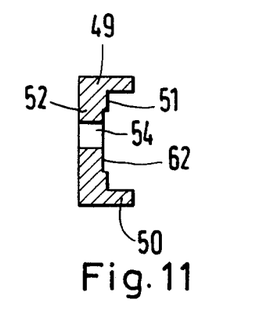
FIG. 11 is a view showing a section taken along line XI—XI of FIG. 10.
Figure 12:
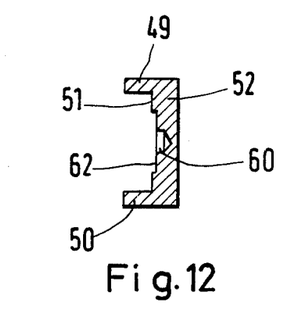
FIG. 12 is a view showing a section taken along line XII—XII of FIG. 10.

That end of the push rod 23 remote from the spur gear 19 is flattened on its side (FIG. 2). The flattening is formed by a recess 46 which extends as far as the free end (FIGS. 2 and 6). The recess 46 is provided on that side of the push rod which extends parallel to the intermediate wall 45, and extends over the entire height of the push rod. The base 47 of this recess 46 serves as a contact surface for the saw blade 7, which is held against the base 47 by a thrust or contact piece 48 (FIGS. 10 to 12). The thrust piece 48 is constructed substantially with a U-shape, and has sides 49 and 50 which are parallel to one another, and with which it partially overlaps the push rod 23 on the upper and lower side. The distance between the sides 49 and 50, which are of equal length, thus corresponds to the height of the push rod 23 (FIG. 6). The saw blade 7 bears against the base 51 of a cross-piece 52 of the thrust piece 48. The saw blade 7 has the same height as the push rod 23, so that it extends between the two sides 49 and 50 of the thrust piece 48. A tightening screw 53 projects through a bore 54 in the cross-piece 52 of the thrust piece 48, through an insertion opening 55 of the saw blade 7 (FIG. 9), and is screwed into a threaded bore 56 in the push rod 23. At the height of the tightening screw 53, the housing part 6 is provided with an opening 57 (FIG. 2) through which the tightening screw 53 is accessible from outside for tightening or release.

In order to be able to attach the saw blade 7 to the push rod 23 in an accurate position and in a simple manner, a centering pin 58 which projects beyond the base 47 of the recess 46 is provided close to the free end of the push rod 53 (FIG. 2). The pin 58 projects through a centering opening 59 in the saw blade 7 (FIG. 9), and projects into a blind hole 60 in the cross-piece 52 of the thrust piece 48 (FIGS. 10 and 12). The bore 54 and the blind hole 60 in the thrust piece 48 are slightly staggered with respect to one another, so that the assembly of the thrust piece on the push rod 23 can be carried out without any mistake. The insertion opening 55 in the saw blade 7 is likewise staggered with respect to the centering opening 59, so that the saw blade can be attached to the push rod 23 in an effortless manner from outside in the correct installation position To assemble the saw blade 7, the tightening screw 53 is first of all loosened to such an extent that the thrust piece 48 can be moved into an assembly position on the tightening screw. In this case, the cross-piece 52 of the thrust piece 48 is at such a distance from the base 47 of the recess 46 that the saw blade 7 can be slid between the thrust piece and the push rod 23, or its centering pin 58. The insertion opening 55 is open toward the end face 61 of the saw blade, so that it can be inserted without difficulty between the thrust piece and the push rod. The tightening screw 53 then engages in the insertion opening 55 of the saw blade 7. Furthermore, the saw blade 7 is fitted via its centering opening 59 on the centering pin 58 of the push rod. Thus, the saw blade is aligned in a simple manner exactly with respect to the push rod 23. It is then merely necessary for the tightening screw 53 to be tightened, in which case the thrust piece 48 holds the end of the saw blade against the push rod 23. In so doing, the centering pin 58 of the push rod 23 extends into the blind hole 60 in the thrust piece 48.

Figure 9:
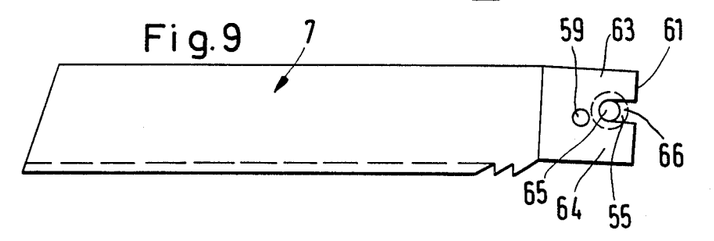
FIG. 9 a view that shows a saw blade of the compass saw according to the present invention in elevation.

The base 51 of the cross-piece 52 of the thrust piece 48 is provided with a recess 62 which serves to receive conventional saw blades which are narrower than the saw blade illustrated in FIG. 9. Thus, conventional saw blades as well as wider saw blades 7 provided for the compass saw described can be used with the thrust piece 48. The recess 62 is shallower than the thickness of the saw blade which is to be centered therein, so that the latter can likewise be clamped reliably between the thrust piece and the push rod 23.

The insertion opening 55 of the saw blade 7 is defined by two clamping sections 63 and 64 of equal length. These sections serve to receive the tightening screw 53, and to guide the latter during the insertion of the saw blade 7 between the thrust piece 48 and the push rod 23. The shaft 65 of the clamping screw 53 rests against the base of the insertion opening 55. At the time of clamping, a clamping force is exerted on the clamping sections 63, 64 by means of the screw head 66. Since the clamping sections 63, 64 are of equal length and equal width, the clamping force occurring in this case is distributed uniformly to both of the clamping sections 63, 64, so that the saw blade 7 can be clamped between the thrust piece 48 and the push rod 23 in a manner free from tipping and tilting. Due to this, even during the clamping operation, the saw blade remains in its exactly aligned position with respect to the push rod 23. In conjunction with the play-free guidance of the push rod, this contributes to the very precise saw cut. The sawing time and the useful life of the saw blade 7 are substantially increased in comparison with known compass saws by the aforedescribed construction of the compass saw, in particular the guidance and clamping of the push rod 23 and of the saw blade 7. Due to the push rod 23 being placed on edge, in conjunction with the precise guidance, the saw blade 7 is guided absolutely vertically in the vertical direction, so that a right-angled cut can be achieved in a simple manner even horizontally. Due to the previously described construction of the thrust piece 48 and of the free end of the push rod 23, all commercially available saw blades can be used, so that even if new compass saws are purchased, the existing saw blades can continue to be used.

The clamping sections 63, 64 of the saw blade 7 have a substantially rectangular cross-section. Naturally, the clamping sections 63, 64 could also have a different construction; for example, they may have a triangular shape, an L-shape, etc. It is merely necessary that they have a shape such that at the time of clamping between the thrust piece 48 and the push rod 23, the saw blade 7 does not tip or tilt, so that the saw blade always remains aligned vertically.

As shown in FIGS. 1 and 2, the thrust piece 48 is located in a mounting space 67 which is open toward the end face of the housing part 6. The mounting space 67 is of such a length that the thrust piece does not emerge from the mounting space during the oscillating movement of the push rod 23.

The housing 2 is widest in the region of the housing part 2, which accommodates the electric motor 11, and in the region of the spur gear 19. In the region of the spur gear 19, the housing part 6 is partially adapted to the contour of the spur gear (FIG. 2), and tapers in the direction toward the free end. Consequently, the compass saw has a very compact construction, as a result of which the compass saw is convenient to handle. As a result of the simple construction of the drive unit for producing the oscillating movement of the push rod 23, the compass saw is also relatively light weight, so that it is possible to operate the compass saw over relatively long periods of time without tiring.

Figure 13:
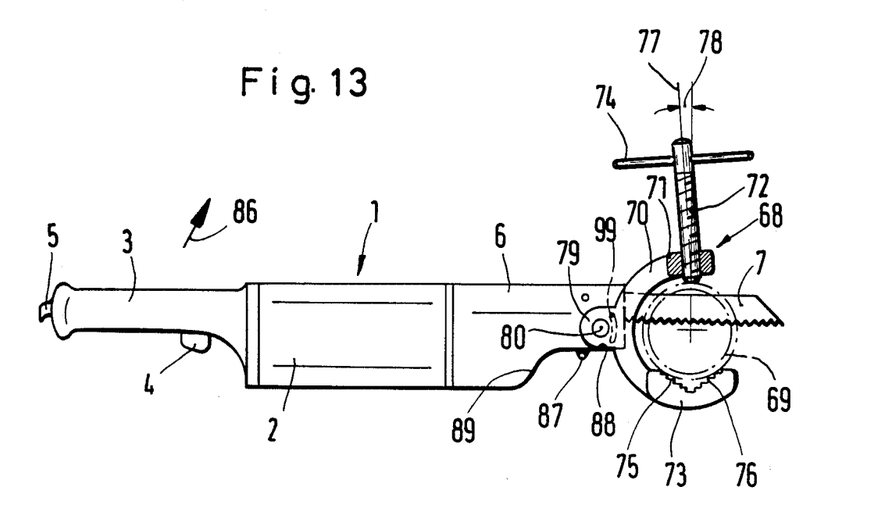
FIG. 13 is a view that shows one embodiment of the compass saw according to the invention with an attached clamping mounting for a workpiece which is to be sawed off, in elevation.
Figure 14:
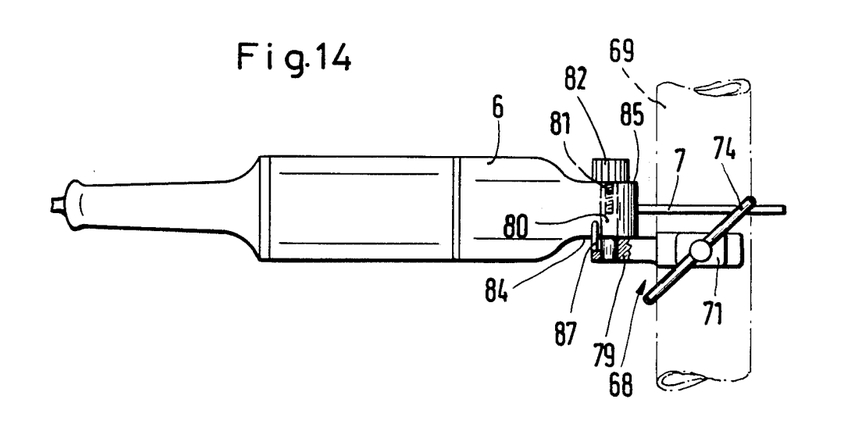
FIG. 14 is a plan view of the arrangement of FIG. 13.

A clamping device 68 can be connected to the housing part 2; with this device, the workpieces 69 which are to be machined can be clamped (FIGS. 1, 13 and 14). As shown in detail in FIGS. 13 and 14, the clamping device 68 has a bracket 70 which is bent in the shape of a semicircle. One end of the bracket is provided with a spindle nut 71 for a clamping spindle 72, and the other end is provided with a clamping jaw 73. Provided at the free end of the clamping spindle 72 is a handle 74, by means of which the clamping spindle can be easily rotated. The clamping jaw 73 has two clamping surfaces 75 and 76 which are inclined in opposite directions, and on which the workpiece 69 is supported. The clamping surfaces 75, 76 are provided with teeth, so that the workpiece 69 can be clamped reliably during sawing. Since the forces occurring during sawing are relatively low, it is not necessary for the clamping surfaces 75, 76 to have teeth; even then the workpiece 69 is held securely during sawing. The axis 77 of the clamping spindle 72 is disposed at an acute angle 78 with respect to the plane of the symmetry of the clamping jaw 73, and is inclined obliquely outwards (FIG. 13). This position of the clamping spindle 72 ensures that the workpiece 69 is pressed into the clamping device 68 during clamping, as a result of which the workpiece is held particularly securely in the clamping device. However, the clamping spindle 72 may also be disposed in the plane of symmetry of the clamping jaw 73.

The bracket 70 is provided with an extension or flap 79 which projects outwardly and which is provided with a bolt 80 projecting perpendicularly. The free end of the bolt has a blind hole 81 which is provided with an internal thread for a securing screw 82. Close to its end face, the housing part 6 is provided with a through hole 83 which extends at right angles to the stroke direction of the push rod 23 (FIG. 6), and in which the bolt 80 of the clamping device 68 is inserted. In the region of the through hole 83, the housing part 6 has outer sides 84 and 85 which extend parallel to one another (FIG. 14), and against which the flap 79 of the clamping device, or the head of the securing screw 82, may rest. The outer sides 84, 85 are parallel to the plane of the saw blade, so that the clamping device 68 can be aligned exactly parallel to the saw blade 7.

The clamping device is pivotably attached to the housing 1 of the compass saw by means of the bolt 80 and the securing screw 82. If it is intended to saw through the workpiece 69, the latter is first of all clamped in the clamping device. Moreover, the workpiece 69 can be clamped in known manner on a vise or the like (not shown). The compass saw is now tilted with respect to the clamping device in such a way that the saw blade 7 rests on the workpiece 69. The compass saw is then switched on by the switch 4, so that the saw blade 7 carries out the elliptical stroke.

During sawing of the workpiece 69, the compass saw is tilted with respect to the clamping device 68 in the direction of the arrow 86 in FIG. 13, in which case the saw blade 7 constantly penetrated deeper into the workpiece 69 until it is sawed completely through. The clamping device 68 can be easily released from, or mounted on, the compass saw by means of the securing screw 82 and the bolt 80, so that the clamping device need only be attached to the compass saw in case of need. The clamping device 68, which is supported on the side of the housing part 6 by means of the flap 79, contributes to the exact cut, since due to the latter the compass saw is prevented from being applied obliquely to the workpiece 69 accidentally. In conjunction with the precise guidance of the saw blade and the push rod, the workpieces 69 may thus be sawed exactly vertically In order that the clamping device 68 cannot swing into the gripping region on the housing part 6 when the compass saw is being carried, the latter is provided with a stop 87, with which the clamping device can come into abutment against one underside 88 of the housing part 6 (FIG. 13). The clamping device 68 can therefore only swing into the end position illustrated in FIG. 13 with respect to the housing 1. When the operator grips the compass saw by one hand on the handle 3, and by the other hand supports it at the other end in the gripping region 89, there is no danger that the hand may be trapped or squeezed in the gripping region by the clamping device 68 swinging back.

Figure 5:
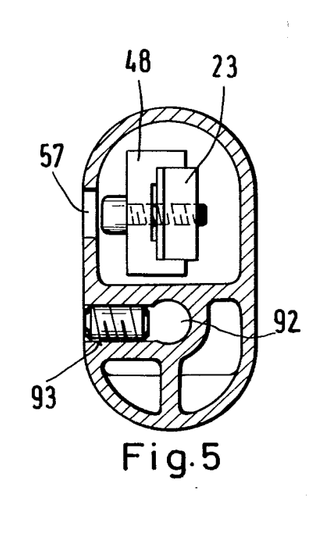
FIG. 5 is a view showing a section taken along line V—V of FIG. 1.
Figure 15:
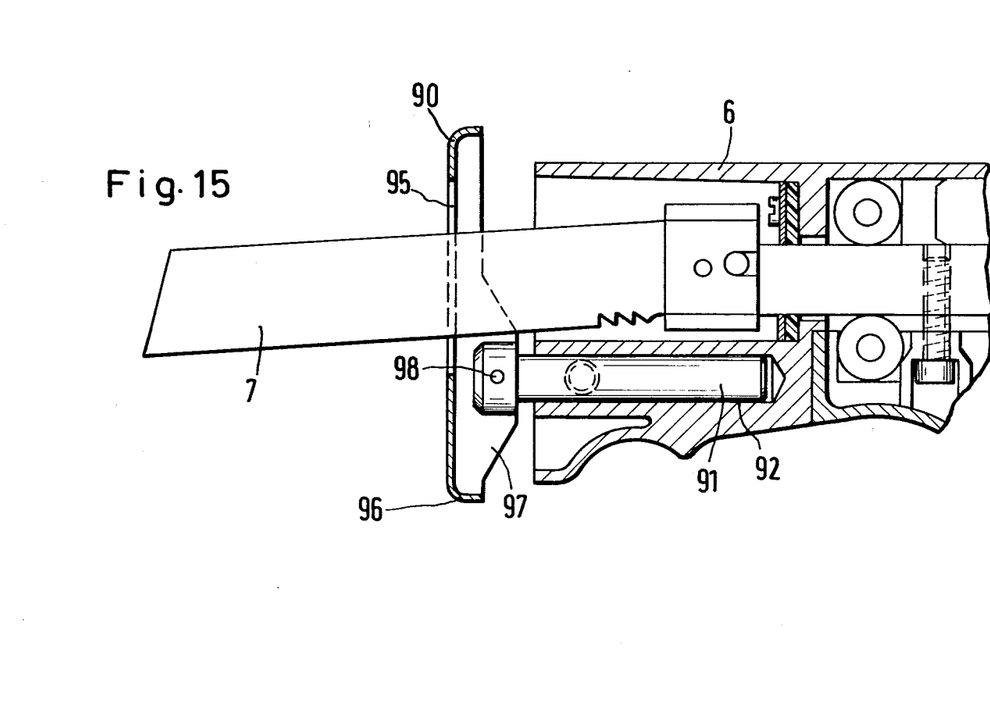
FIG. 15 is a view that shows the front end of one embodiment of the compass saw according to the invention with a support shoe, in longitudinal section.

In place of the clamping device 68, a support shoe 90 may be attached to the free end of the compass saw (FIG. 15). This support shoe 90 is pivotably seated on a pintle 91, which is inserted in an axial receiving means 92 located below the mounting space 67 in the housing part 6 (FIG. 5). The receiving means 92 opens into the end face of the housing part 6, and is centrally disposed therein. Located at right angles to the receiving means 92, and at a distance from the end face, is a threaded bore 93 (FIG. 5) which opens into the receiving means and is provided for a setscrew 94 (FIG. 2), by means of which the pintle 91 can be clamped. The support shoe 90 has a through hole 95, for the saw blade 7, which is of such a size that the saw blade can move unimpeded. The edge 96 of the support shoe 90 is rounded off in the direction toward the compass saw, and serves as a skid by means of which the compass saw rests on the workpiece which is to be sawed. The support shoe 90 is provided with a side piece or flap 97 which extends toward the compass saw, and to which the pintle 91 is attached by a securing pin 98 which extends at right angles to the saw blade 7.

Serving as a stop for the clamping device 68 in place of the stop 87, a groove 99 in the shape of part of a circle (FIG. 13) may be provided in the flap 79 on the side facing the housing part 6; the groove is curved about the axis of the bolt 80. Engaging in the groove 99 as a stop member is the head 100 (FIG. 2) of a screw (not shown) which is screwed into the threaded bore 93. The ends of the groove 99, which are rounded off to correspond to the head 100 form counterstops for the screw head, against which the latter bears in the two end positions of the clamping device 68.

The present invention is, of course, in no way restricted to the specific disclosure of the specification and drawings, but also encompasses any modifications within the scope of the appended claims.

What I claim is:

1. A portable compass saw having a housing in which are accommodated a drive motor, for a push rod to which is connected a saw blade, and an oscillating drive, which includes a gear which is held, by means of a shaft, in mounting means in said housing; a pinion of a drive shaft of said drive motor engages teeth of said gear; said gear of said oscillating drive also includes a pin which is disposed at a distance from, and extends parallel to, the axis of rotation of said gear; said pin is drivingly connected with a clutch member of said oscillating drive; said clutch member is connected to said push rod, and is provided with a guide for said pin, with said guide extending at substantially right angles to the longitudinal axis of said push rod; the improvement wherein:
   said teeth of said gear are disposed on that side of the latter which faces said push rod; said pinion is disposed in the region between said gear and said push rod; and said gear is seated loosely on said shaft, and is held thereon under the load of at least said pinion, such clutch member, in plan view, having a T-shape; and said guide for said pin being in the form of a cross-piece of said clutch member;
   said clutch member being provided with a foot, with said push rod being detachably secured to said foot.

2. A compass saw according to claim 1, in which said mounting means is a projection of said housing which projects into the latter; that side of said gear remote from said teeth side thereof rest on said projection.

3. A compass saw according to claim 1, in which said pinion is also provided with teeth, with said teeth of said gear and of said pinion being arranged, with respect to their directions of rotation, in such a way that said pinion experiences a push force which is directed toward the axis of rotation of said gear.

4. A portable compass saw having a housing in which are accommodated a drive motor, for a push rod to which is connected a saw blade, and an oscillating drive, which includes a gear which is held, by means of a shaft, in mounting means in said housing; a pinion of a drive shaft of said drive motor engages teeth of said gear; said gear of said oscillating drive also includes a pin which is disposed at a distance from, and extends parallel to, the axis of rotation of said gear; said pin is drivingly connected with a clutch member of said oscillating drive; said clutch member is connected to said push rod, and is provided with a guide for said pin, with said guide extending at substantially right angles to the longitudinal axis of said push rod; the improvement wherein:
   said teeth of said gear are disposed on that side of the latter which faces said push rod; said pinion is disposed in the region between said gear and said push rod; and said gear is seated loosely on said shaft, and is held thereon under the load of at least said pinion; and
   at least one pressure member which acts on that side of said push rod opposite said oscillating drive; and via said push rod and said clutch member, said at least one pressure member exerts a force directed against said gear.

5. A compass saw according to claim 4, in which said clutch member, in plan view, has a T-shape; and in which said guide for said pin is in the form of a cross-piece of said clutch member.

6. A portable compass saw having a housing in which are accommodated a drive motor, for a push rod to which is connected a saw blade, and an oscillating drive, which includes a gear which is held, by means of a shaft, in mounting means in said housing; a pinion of a drive shaft of said drive motor engages teeth of said gear; said gear of said oscillating drive also includes a pin which is disposed at a distance from, and extends parallel to, the axis of rotation of said gear; said pin is drivingly connected with a clutch member of said oscillating drive; said clutch member is connected to said push rod, and is provided with a guide for said pin, with said guide extending at substantially right angles to the longitudinal axis of said push rod; the improvement wherein:
   said teeth of said gear are disposed on that side of the latter which faces said push rod; said pinion is disposed in the region between said gear and said push rod; and said gear is seated loosely on said shaft, and is held thereon under the load of at least said pinion; and
   a counter member for generating a vertical stroke of the push rod and of the saw blade; said counter member being in the form of a sliding member, which is seated on said pin and cooperates with said guide, which is formed by an inclined surface provided on said clutch member; said inclined surface extending at an acute angle to that side of said gear which faces said push rod; said sliding member being provided with a correspondingly inclined sliding surface which rests against said inclined surface of said clutch member.

7. A compass saw according to claim 6. in which said clutch member is provided with a cross-piece which has a U-shaped cross-section and extends substantially at right angles to said push rod; said inclined surface of said clutch member is formed by that side of said cross-piece which faces away from said push rod.

* * * * *